Dec. 11, 1962 J. REID 3,067,455
APPARATUS FOR MAKING A WINDOW PANE SUPPORTING
AND/OR GUIDING STRUCTURE
Original Filed April 19, 1956 2 Sheets-Sheet 1
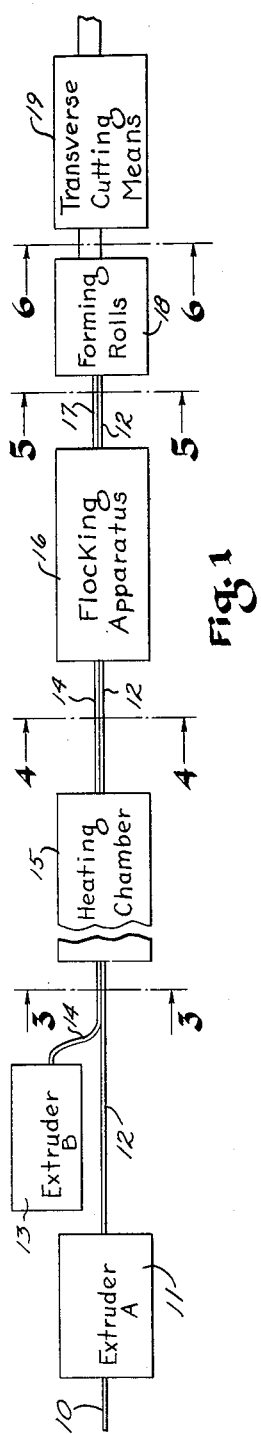
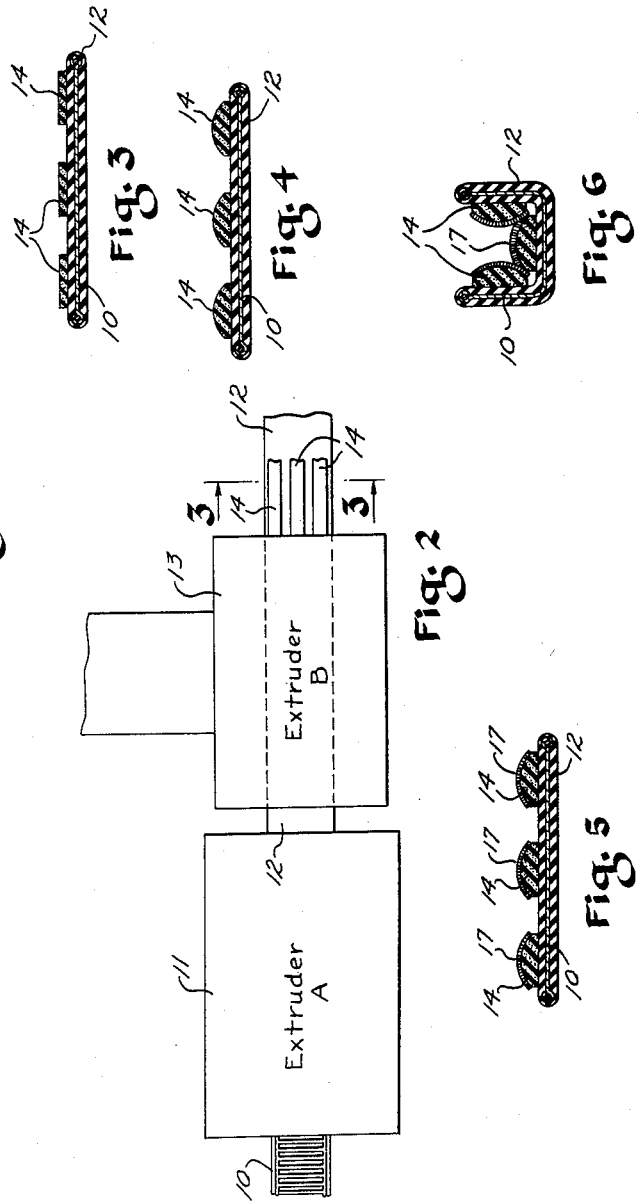
INVENTOR.
James S. Reid
BY
Hyde, Meyer, Baldwin & Doran
Attorneys Dec. 11, 1962 J. REID 3,067,455
APPARATUS FOR MAKING A WINDOW PANE SUPPORTING
AND/OR GUIDING STRUCTURE
Original Filed April 19, 1956 2 Sheets-Sheet 2

INVENTOR.
James S. Reid
BY
Hyde, Meyer, Baldwin & Doran
Attorneys

United States Patent Office 3,067,455
Patented Dec. 11, 1962

3,067,455
APPARATUS FOR MAKING A WINDOW PANE SUPPORTING AND/OR GUIDING STRUCTURE
James Reid, Hudson, Ohio, assignor to The Standard Products Company, Cleveland, Ohio, a corporation of Ohio
Original application Ser. No. 579,384, dated Apr. 19, 1956. Divided and this application May 28, 1958, Ser. No. 738,463
2 Claims. (Cl. 18—4)

This invention relates to window pane supporting and/or guiding structures, such as the structures, frequently of channel shape, for the window panes of automobiles and the like, and to apparatus for making the same.

This is a divisional application of my co-pending application for Window Pane Supporting and/or Guiding Structures and Methods of and Apparatus for Making the Same, Serial No. 579,384, filed April 19, 1956.

The invention has for its primary object the provision of a window pane supporting and/or guiding structure which is characterized by its structural simplicity, the economy of its manufacture, its long service life, and the effectiveness with which it performs its supporting and/or guiding functions.

A further and more specific object of the present invention is the provision of a window pane supporting and/or guiding structure which comprises a core coated with rubber or a rubber-like material to which is integrally united one or more sponge rubber ribs for the cushioning of the window pane, the rib or ribs being provided with flock fibers or other suitable covering means for engagement with said window pane.

Further objects of the present invention, and many of its practical advantages will be referred to in or will be evident from the following description of certain embodiments thereof, as illustrated in the accompanying drawings, in which:

FIG. 1 is a diagrammatic side elevational view of apparatus for making the present window pane supporting and/or guiding structures;

FIG. 2 is a diagrammatic top plan view of the two extruders;

FIG. 3 is a cross-sectional view of the core strip assembly of one embodiment of the present window pane supporting and/or guiding structure, in the stage of its manufacture when at the location denoted by the line 3—3, FIGS. 1 and 2;

FIG. 4 is a view corresponding to FIG. 3 but showing the cured condition of the core strip assembly when at the location denoted by the line 4—4, FIG. 1;

FIG. 5 is a view corresponding to FIGS. 3 and 4 but showing the flocked condition of the core strip assembly when at the location denoted by the line 5—5 of FIG. 1;

FIG. 6 is a cross-sectional view of the finished supporting and/or guiding structure, in the channel-shaped form which it has acquired when at the location denoted by the line 6—6 of FIG. 1;

Figure 7:
FIG. 7 is a view corresponding to FIG. 6 but showing a slightly modified form of window pane supporting and/or guiding structure embodying the present invention.

Before describing those embodiments of the present invention which are here illustrated, it is to be understood that the present invention is not limited to those embodiments, as it obviously may take other forms. It also is to be understood that the terminology and phraseology herein used is for purposes of description and not of limitation, as the scope of the present invention is denoted by the appended claims.

In the manufacture of a window pane supporting and/or guiding structure embodying one form of the present invention, a suitable core strip, such as the generally flat, transversely slotted sheet metal core strip 10 of FIGS. 1 and 2, is passed endwise through a conventional and hence diagrammatically shown extruder 11 to coat such core strip with an enclosing layer of uncured rubber or rubber-like material 12, hereinafter merely called "rubber." Thereafter and without interruption of its endwise movement, the coated core strip 10 passes through a second diagrammatically shown extruder 13, preferably across extruder or one arranged transversely with respect to the first extruder 11, for the purpose of depositing upon the upper surface of and bonding to or uniting with the coated core strip 10, one or more relatively narrow, longitudinally disposed layers or ribs of uncured sponge rubber 14, there being three such ribs in laterally spaced relation in this particular embodiment of the invention.

At this stage of its development, or when it is at the location denoted by the line 3—3 in FIGS. 1 and 2, the core strip assembly has, in cross section, the appearance shown in FIG. 3, the sponge rubber of the three ribs 14 being of relatively flat or non-expanded form.

The core strip assembly now passes from the second or cross extruder 13 into a suitable heating chamber 15, still without interruption or cessation of its endwise movement. Preferably, the heating chamber 15 is of very substantial length, to thereby enable it to hold quite a long section of the core strip assembly, which materially increases the rate of production of the present window pane supporting and/or guiding structure and thus the economy thereof. Any suitable heating medium, such as steam, or any suitable instrumentality, may be used as the source of heat for the chamber 15.

The core strip assembly remains in the heating chamber only as long as is necessary for the simultaneous curing of the sponge rubber of the ribs 14 and the rubber or rubbre-like material of the enclosing core strip coating 12. As will be readily understood, the composition of the sponge rubber is such that said material will expand upon the application of heat thereto, and the term "curing," as applied to the sponge rubber ribs 14, thus embraces and includes the expansion thereof.

If necessary for the curing operation, the endwise movement of the core strip assembly may be temporarily halted or arrested when the heating chamber 15 has been filled therewith, in which event the core strip assembly will have a step-by-step movement, with the periods of pause or arrested motion being of such duration as is required for the curing operation.

In this stage of its development, or when it is past the heating chamber and thus at the location denoted by the line 4—4, FIG. 1, the core strip assembly has, in cross section, the appearance shown in FIG. 4, wherein the sponge rubber ribs 14 are in their cured and expanded form. The rubber or rubber-like material of the core coating 12 also, of course, is now cured, but the curing of this material does not result in any expansion thereof.

From this stage in its development, the core strip assembly passes, by endwise movement thereof, through suitable flocking apparatus 16 which also is here diagramatically shown, inasmuch as it can take any desired form. In this apparatus, the cured and expanded sponge rubber ribs 14 are covered by suitable fibrous flock 17, as shown in FIG. 5, for soft and effective slidable contact with the window pane, as will be readily understood.

The flocked core strip assembly now passes through suitable forming rolls 18 (diagrammatically shown inasmuch as their construction is well known) by continued endwise movement of said core strip assembly, and by such rolls, said assembly is bent to its finished or final channel-shaped form, as shown in FIG. 6. As there shown, the flocked sponge rubber ribs 14 are located within the channel in position for yieldable resilient engagement with the side faces of the window pane and also with the end edge thereof. As a result, said pane is most effectively cushioned and supported within the channel and most effectively guided thereby if the window pane is one which is slidably mounted.

The final step in the present method is the cutting of the channel-shaped window pane supporting and/or guiding structure into pieces or sections of the desired length, and for such purpose, any suitable transverse cutting mechanism 19 is employed. From such cutting mechanism, the pieces or sections are collected in any suitable means, as will be readily understood.

From the foregoing description of a window pane supporting and/or guiding structure embodying one form of the present invention, it will be evident that such structure is of simple and improved character and ideally suited for its supporting and/or guiding functions. It also will be evident that the method for the manufacture of such supporting and/or guiding structure is of simple and improved form, in which said structure moves, with but one relatively slight pause, through the various operational steps in a quick and economical manner which enables the structure to be made and sold at low cost. The apparatus used in the manufacture of said supporting and/or guiding structure is also of simple and conventional form, but so arranged as to enable the method steps to be efficiently and inexpensively carried out, all as will be readily understood.

As heretofore indicated, the window pane supporting and/or guiding structure shown in FIG. 6 is but one embodiment of the present invention.

Figure 8:
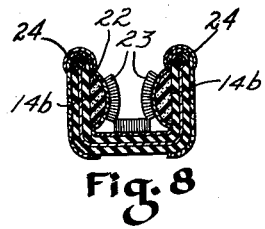
FIG. 8 is another view corresponding to FIG. 6 but showing another slightly modified form of window pane supporting and/or guiding structure embodying the present invention.

In FIGS. 7 and 8 are shown two slightly modified forms of the present supporting and/or guiding structure, namely, embodiments in which the sponge rubber ribs are not flocked but are covered by linings with which the channel structures are provided.

In the embodiment of FIG. 7, there are three sponge rubber ribs 14a, as in the channel structure of FIG. 6, but said ribs are covered by a plain channel lining 21 of felt or the like which extends down around the side walls of the channel and below the base wall, being adhesively or otherwise suitably secured in place.

In the embodiment of FIG. 8, there are but two sponge rubber ribs 14b, located at the sides of the channel structure for securing a window pane therebetween, and as in FIG. 7, a channel lining 22 is provided for covering the sponge rubber ribs. The lining 22, however, is not of plain form but is provided with pile 23 in those areas thereof which overlie the sponge rubber ribs 14b and also in that area thereof which overlies the base of the channel structure. Also metal finishing beads 24 are provided for the outer or free edges of the side walls of the channel structure of FIG. 8.

As will be readily understood, the manufacture of the channel structures of FIGS. 7 and 8, suitable fabric lining applying means, which is well known in the art, is substituted for the flocking apparatus 16 in the apparatus used for the manufacture of the channel structure shown in FIG. 6.

Figure 9:
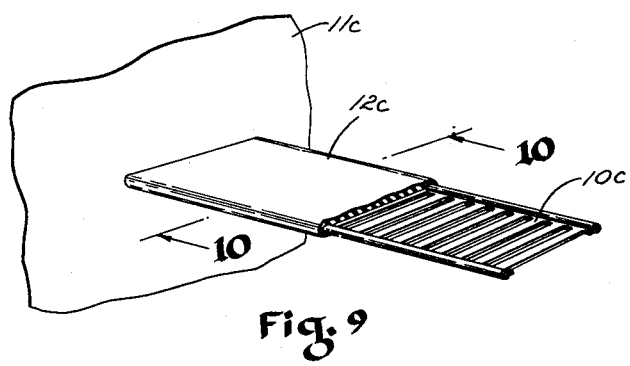
FIG. 9 is a fragmentary perspective view showing the extrusion of a sponge rubber coating onto a bare core strip.
Figure 10:
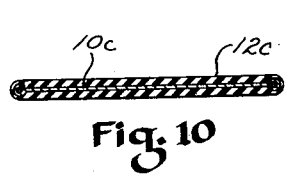
FIG. 10 is a cross-sectional view of said coated core strip, as taken on the line 10—10 of FIG. 9.
Figure 11:
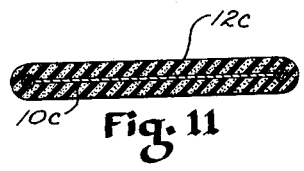
FIG. 11 is a view corresponding to FIG. 10 but showing the coated core strip after the sponge rubber thereof has been cured, with consequent expansion thereof.

In FIG. 9, another embodiment of the invention is illustrated, namely, an embodiment wherein the rubber or rubber-like core coating 12 of the previous embodiments is omitted. In this embodiment of the invention, the core strip 10c of metal or the like is enclosed within a coating of uncured sponge rubber 12c by the use of a suitable fragmentarily shown extruder 10c. The sponge rubber coating 12c is then cured and expanded, as in FIG. 11, by the use of the aforesaid heating chamber 15, and then flocked along three laterally spaced, longitudinally disposed areas 17c, as in FIG. 12, by the use of the aforesaid flocking apparatus 16. The coated and flocked core strip is then bent into its final channel shape, as in FIG. 13, by the use of the aforesaid forming rolls 18, and then cut into proper lengths by the use of the aforesaid transverse cutting means 19, as will be readily understood.

Figure 12:
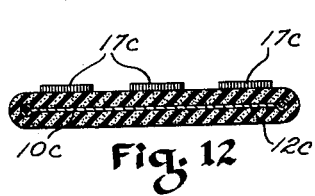
FIG. 12 is a view similar to FIG. 11 but showing the application of flock fibers to the cured sponge rubber of the core strip.

As will be readily understood, the sponge rubber coating of the channel of FIG. 12 provides an effective cushion for the support and/or guidance of a window pane and the flocking of such sponge rubber provides a most satisfactory type of contacting surface for said window pane.

Figure 13:
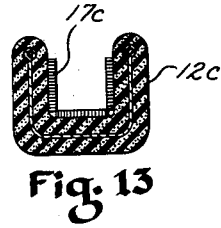
FIG. 13 is a cross-sectional view of the finished window pane supporting and/or guiding structure as constructed in accordance with the embodiment of the invention as illustrated in FIGS. 9 to 12 inclusive.

As the method and the apparatus for the manufacture of the channel structure of FIG. 13 will be obvious from the description pertaining to the manufacture of the channel structure of FIG. 6, no further comments with respect to the method and the apparatus for the manufacture of the FIG. 13 channel structure is believed to be necessary.

To those skilled in the art to which the present invention relates, further features and advantages of such invention will be evident.

Having described by invention, I claim:

1. Apparatus for making a window pane supporting structure, which comprises a first extruding means for applying an uncured enclosing rubber coating to a core strip, means for conveying said core strip to said first extruding means, a second extruding means located in close proximity to said first extruding means for applying a rib of uncured sponge rubber to said coated core strip, means for conveying said coated core strip from said first extruding means to said second extruding means, a heated elongated chamber in which said core strip assembly is positionable for the simultaneous curing of said sponge rubber rib and the rubber coating of said core strip, means for conveying said core strip assembly from said second extruding means to said heated chamber, means for applying a covering to said cured rubber rib for engagement with said window pane, means for conveying said core strip assembly from said heated chamber to said covering means, means for progressively forming said core strip assembly into generally channel shape for the reception of the window pane, and means for conveying the core strip assembly from said covering means to said forming means.

2. Apparatus for making a window pane supporting structure, which comprises a first extruding means for applying an uncured enclosing rubber coating to a core strip, means for conveying said core strip to said first extruding means, a second extruding means located in close proximity to said first extruding means for applying a rib of uncured sponge rubber to said coated core strip, means for conveying said coated core strip from said first extruding means to said second extruding means, a heated elongated chamber in which said core strip assembly is positionable for the simultaneous curing of said sponge rubber rib and the rubber coating of said core strip, means for conveying said core strip assembly from said second extruding means to said heated chamber, flocking means for applying flock fibers to said cured rubber rib for engagement with said window pane, means for conveying said core strip assembly from said heated chamber to said flocking means, means for progressively forming said core strip assembly into generally channel shape for the reception of the window pane, means for conveying the core strip assembly from said flocking means to said forming means, means for cutting the formed core strip assembly into predetermined lengths, and means for conveying the core strip assembly from said forming means to said cutting means.

References Cited in the file of this patent

UNITED STATES PATENTS

| | | |
|---|---|---|
| 1,834,554 | Taylor | Dec. 1, 1931 |
| 1,880,697 | Beynon | Oct. 4, 1932 |
| 1,890,308 | Taylor | Dec. 6, 1932 |
| 1,931,333 | Taylor | Oct. 17, 1933 |
| 2,054,021 | Livensparger | Sept. 8, 1936 |
| 2,106,658 | Weisenburg | Dec. 21, 1937 |
| 2,175,099 | Abbott | Oct. 3, 1939 |
| 2,204,622 | Reid | June 18, 1940 |
| 2,471,752 | Ingmanson | May 31, 1949 |
| 2,774,120 | Beare | Dec. 18, 1956 |
| 2,792,323 | Ashcroft et al. | May 14, 1957 |
| 2,821,430 | Grede | Jan. 28, 1958 |
| 2,835,924 | Schmeling | May 27, 1958 |

FOREIGN PATENTS

| | | |
|---|---|---|
| 161,277 | Australia | Feb. 18, 1955 |